United States Patent [19]
Forcinal et al.

[11] 3,876,335
[45] Apr. 8, 1975

[54] WELDED ROTOR

[75] Inventors: Charles Forcinal, Cravanche; René Perrin; André Coulon, both of Belfort, all of France

[73] Assignee: Societe Generale De Constructions Electriques Et Mecaniques (ALSTHOM), Paris, France

[22] Filed: Aug. 23, 1972

[21] Appl. No.: 283,032

[30] Foreign Application Priority Data
Aug. 23, 1971 France .................. 71.30605

[52] U.S. Cl. .................. 416/198; 416/213
[51] Int. Cl. ........................... F01d 5/06
[58] Field of Search ............... 416/213, 198–201; 415/199 R

[56] References Cited
UNITED STATES PATENTS
2,450,493  10/1948  Strub ........................ 416/201
2,614,796  10/1952  Miller ....................... 416/201 X
2,637,521   5/1953  Constantine et al. ........ 416/201 UX FOREIGN PATENTS OR APPLICATIONS
900,312   9/1944  France ................. 416/198 A
287,964  10/1915  Germany .................... 416/201
599,809   3/1948  United Kingdom ....... 416/198 A
117,008   8/1946  Sweden ................ 416/200 A

*Primary Examiner*—Everette A. Powell, Jr.
*Attorney, Agent, or Firm*—Craig & Antonelli

[57] ABSTRACT

A rotor for turbines or the like formed of an axial succession of elements, such as discs or rings, welded together with radially internal adjacent portions of two consecutive elements forming an annular ridge projecting radially inwardly, the ridge having the general form of a trapezoid.

6 Claims, 4 Drawing Figures

WELDED ROTOR

The invention concerns a rotor formed of an axial succession of annular elements welded to one another.

It is known that a rotor is more especially subjected to alternating bending stresses which may be very considerable more especially in the case of rotors of large steam turbines. After welding, the welded portion of the rotors may comprise surface irregularities which should be eliminated since there is a risk that they will give rise to the formation of crack starts, then cracks, until by a gradual process the rotor is subjected to a fatigue fracture.

In French Patent Specification No. 1,150,086 it has already been proposed to form an annular ridge or bead projecting radially towards the interior and constituted by lips each formed on one of the radially internal adjacent portions of two consecutive elements welded to one another, so as to reduce the stresses in the zone from which cracks may start, but this arrangement does not in itself provide any security in the case of welding defects, and it is necessary to eliminate systematically any defect which appears after welding if it is desired to avoid the risks of fracture.

Very great difficulty is, therefore, involved in the construction of welded rotors whose welds may comprise local irregularities at inaccessible places so that the finished rotor may have to be classed as a reject.

The present invention proposes, on the other hand, accepting certain defects in welding provided that these defects do not go beyond the limit which is previously fixed, in accordance with an estimation of the possibilities of the welding system used. For this purpose, many photo-elasticity tests have been carried out and have made it possible to define a form of ridge such that it is reliably ensured that the zone where welding irregularities occur to a given maximum depth is a zone where the alternating bending stresses of the rotor do not act. Therefore, a zero stress zone is created at a depth which is fixed previously and is chosen to be at least equal to the maximum depth of the foreseeable welding defects. After manufacture, it is verified that the defects do not in fact go beyond the fixed limit.

To obtain this result, the invention proposes a ridge whose cross section is in the general form of a trapezoid whose sides are inclined at approximately 45° relatively to the bases, the small base being the portion projecting furthest outwards of the bead, the height of which is equal to at least 10 times and at the most 20 times the maximum width of the irregularities likely to occur at the small base at the time of welding, and the small base being substantially of the same size as the height.

The height of the trapezoid is in fact to be between a minimum necessary for eliminating stresses in the region of the small base and a maximum beyond which considerable stresses in the opposite direction would occur in this region.

Modern welding methods, such as electron beam welding, make it possible to limit cracks to a depth of a millimeter at the most. Therefore, the ridge will advantageously be given a height of at least 10 mm, and 20 mm at the most, which effectively creates a zone without alternating bending stresses of a depth of 1 millimeter. The 45° inclination of the sides of the ridge also have the advantage of permitting easy verification of defects by means of ultrasonic devices.

Referring now to the accompanying diagrammatic drawings, an example of one embodiment of the invention will now be described.

Figure 1:
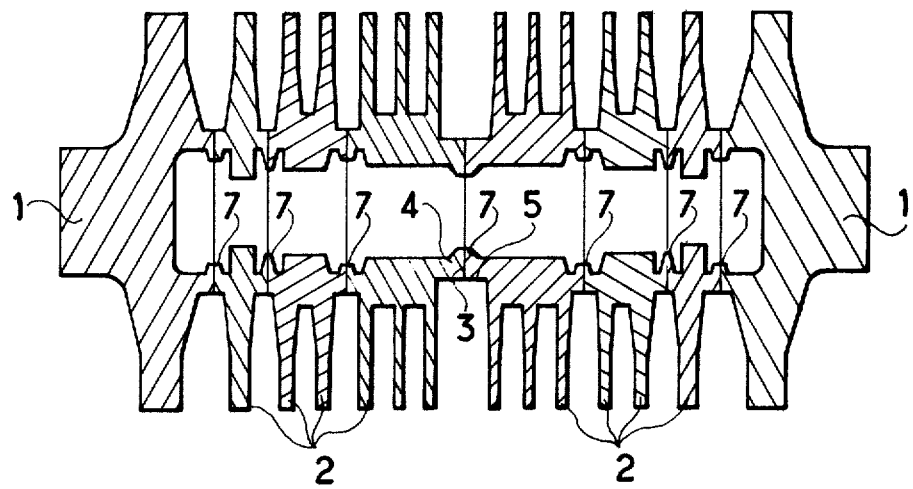
FIG. 1 shows a section through a turbine rotor with welded elements.

The rotor of FIG. 1 is constituted of elements, such as the discs 1 and rings 2, welded to one another along joints, such as 3, between two parts 4 and 5, the welding operation being carried out from the exterior of the rotor and the internal portion of the joint 3 being inaccessible, so that a mending welding operation cannot be carried out. In this internal portion of the joint 3, there may be more especially a weld gap, which could be compared to a saw cut or even to an actual notch. This type of defect is a source of a concentration of stresses in the region in the vicinity of the irregularity.

Figure 2:
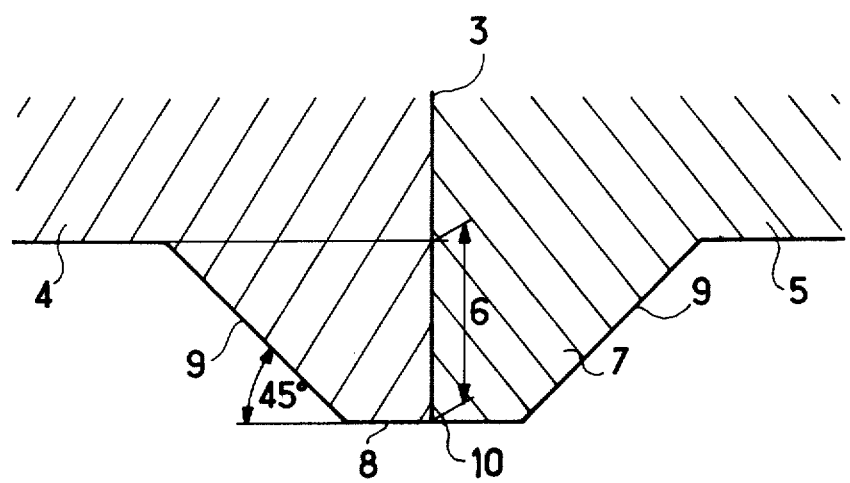
FIG. 2 shows on a larger scale a section through the ridge provided in the parts to be assembled together.

The object of the invention is to situate the irregularity in a zone where the stress is nil, which makes it possible to tolerate the stresses without any risk of causing a crack to commence. For this, as FIG. 2 shows, the two parts 4 and 5 each comprise a local projection 6 so as to form, when they are joined together, a ridge 7 the cross section of which is in the form of a trapezoid whose small base 8 corresponds to the portion projecting furthest and whose sides 9 form an angle of 45° with the said base.

The extra thickness provided at the projections 6 depends on the stress-free zone which it is desired to obtain in the lower portion 10 of the joint 3. It is chosen to be equal to at least 10 times, and at the most 20 times, the depth of the gaps which may occur. The small base 8 is equal in size to the height of the projection 6. Thus, the effects of stress concentration due to a major defect of the gap type are eliminated, provided that the depth of the defect is not greater than a tenth of the height 6, and to any irregularity caused by excess welding, whatever the size.

The joint 3 in its radially internal portion is subjected only to its own centrifugal stresses, which are small and in any case less limiting than alternating bending stresses to which it is subjected by the effect of the weight of the rotating mobile body, such stresses producing a risk of fatigue fracture.

On the one hand a welding method will be used which gives the best guarantee of quality in the radially internal zone of the joint 3, for example electron beam welding. On the other hand, because of the ridge according to the present invention, possible welding excess portions or gaps will be situated in a zero stress zone.

Figure 3:
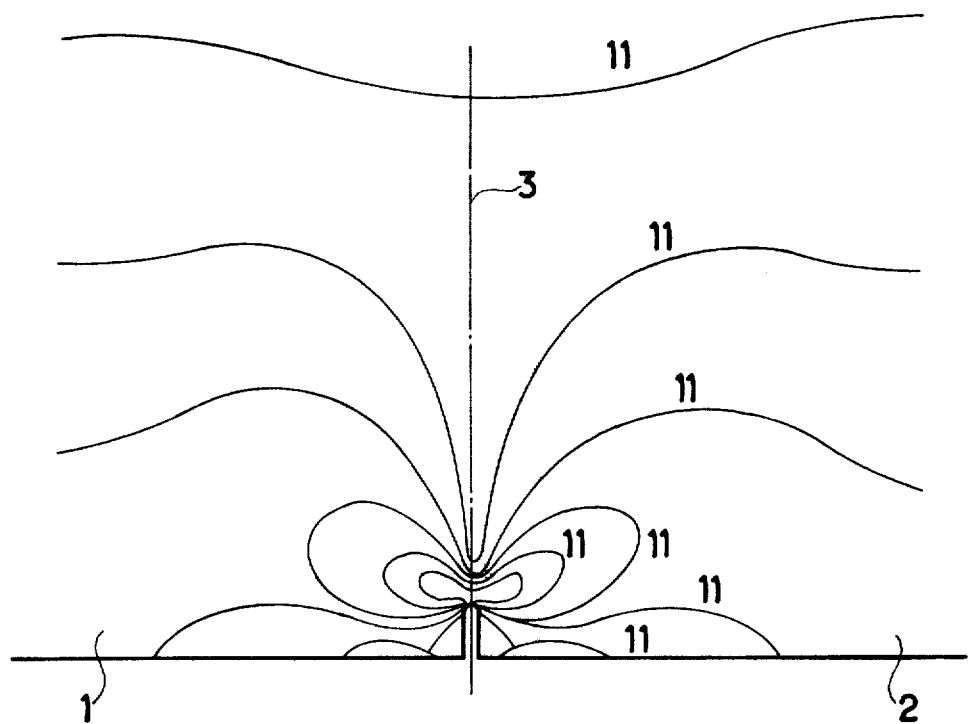
FIGS. 3 and 4 show, in the particular case where the two parts to be assembled are component rings of a rotor, and where a welding defect occurs, the distribution of lines of equal stress, respectively without the use of the invention and with the use of the invention shown in FIG. 2.
Figure 4:
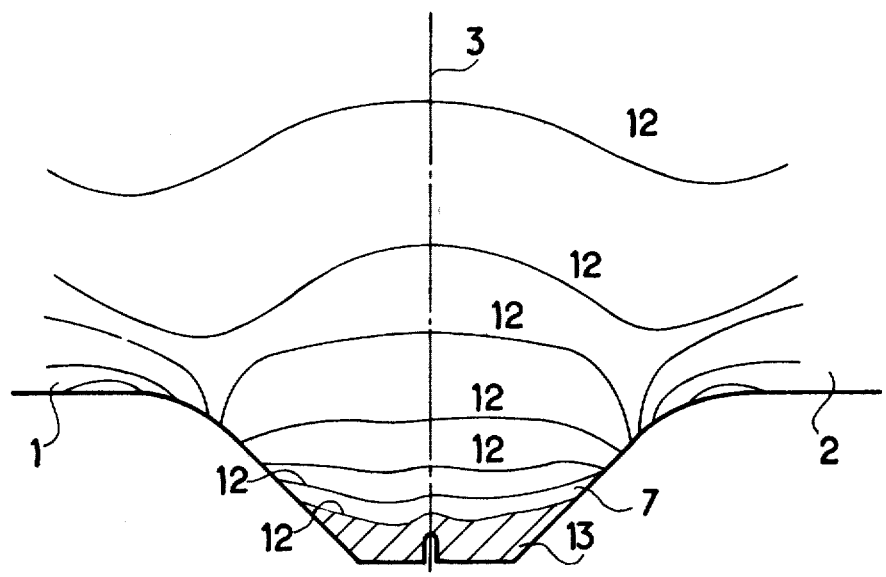

FIGS. 3 and 4 include respective lines 11 and 12 corresponding to places of equal stresses in the case of a welding gap in the joint 3 between the two rings 4 and 5 of the rotor, shown respectively without the use of the invention, and with a ridge 7 provided by the invention (FIG. 2).

In FIG. 4 the stress-free zone has been indicated by hatching and designated with the reference numeral 13. The defect situated in this zone does not involve any risk of developing further during the use of the rotor. On the contrary, in the case of FIG. 3, this same defect will cause a considerable concentration of stress at the upper end of the defect and consequently considerable risks of fatigue fracture.

What is claimed is:

1. A rotor for turbines or the like, comprising an axial succession of annular elements having contiguous base portions welded to one another to form an internal hollow, with radially internal adjacent base portions of two consecutive elements forming an annular ridge projecting radially inwardly into said internal hollow, characterized in that this ridge has a generally trapezoidal configuration, the small base of the trapezoid being the portion of the ridge which projects furthest, wherein the height of the said ridge is equal to at least 10 times and at most 20 times the maximum depth of the irregularities likely to occur at the small base of said trapezoidal cross section when welding is carried out.

2. A rotor according to claim 1, wherein the height of said trapezoidal cross section is at least 10 mm and at the most 20 mm.

3. A rotor according to claim 1, wherein the sides of said trapezoidal configuration are inclined at about 45° relatively to the bases.

4. A rotor according to claim 3, wherein the small base of said trapezoidal cross section has substantially the same length as the height of said ridge.

5. A rotor according to claim 3, wherein the small base of said trapezoidal cross section has substantially the same length as the height of said ridge.

6. A rotor for turbines or the like, comprising a plurality of annular elements having contiguous base portions welded to one another in axial succession with a continuous internal hollow thereby being formed therein, the radially internal adjacent base portions of each two consecutive elements forming an annular ridge projecting radially inwardly into said internal hollow, each ridge having a generally trapezoidal configuration with the small base of the trapezoid being the portion of the ridge which projects furthest into said hollow, said small base being equal in length to the height of said ridge.

* * * * *